United States Patent [19]

Sweet et al.

[11] 4,357,495
[45] Nov. 2, 1982

[54] TELEPHONE LINE FEED

[75] Inventors: Anthony W. Sweet, Saffron Walden; Michael P. Dyer, Stansted, both of England

[73] Assignee: Standard Telephones and Cables Limited, London, England

[21] Appl. No.: 232,913

[22] Filed: Feb. 9, 1981

[30] Foreign Application Priority Data

Feb. 14, 1980 [GB] United Kingdom ............... 8005000

[51] Int. Cl.³ .................... H04M 1/76; H04M 19/00; H04B 3/36
[52] U.S. Cl. .................................. 179/77; 179/16 F
[58] Field of Search ............ 179/18 F, 18 FA, 16 F, 179/16 AA, 70, 77, 170 NC

[56] References Cited

U.S. PATENT DOCUMENTS 3,870,896  3/1975  Kiko ....................... 179/77
4,176,255 11/1979  Rudisill, Jr. ............ 179/16 F
4,254,305  3/1981  Treiber .................. 179/16 F

*Primary Examiner*—Thomas A. Robinson
*Attorney, Agent, or Firm*—James B. Raden; Marvin M. Chaban

[57] ABSTRACT

The direct current line feed for a telephone subscriber's line is derived from a variable voltage source connected to the line. In one case, the source is series connected in one leg of the line while in the other case it is connected across the line. In the first case there is a constant current source across the line while in the second case the voltage source is a constant current device. In both cases a pair of matching resistors is connected across the line with the center tap grounded to provide a high resistance balanced termination for the line. In both cases a high impedance monitor is connected across the line to monitor the voltage conditions on the line, and this, via a control circuit controls the voltage source and the separate constant current device if provided. This enables line voltage to be adjusted to take account of line length without introducing undesirably large dissipation.

8 Claims, 10 Drawing Figures

TELEPHONE LINE FEED

This invention relates to a telphone subscriber's line interface, and especially to the supply thereto of the line current.

The conventional arrangement for feeding a line uses a centre-tapped transformer arrangement with the two sides of the direct current supply connected to the centre of the line side winding of the transformer, which winding is in two parts coupled to AC but not DC via a capacitor. This is cumbersome, uneconomical from the power consumption aspect, and has difficulties when lines of different lengths have to be supplied.

The present invention seeks to overcome the difficulties of such known arrangements.

According to the present invention there is provided a line feeding arrangement for a telephone subscriber's line, which includes a high valued balancing impedance connected between the two wires of the line, said impedance having a centre-tap which is earthed for speech signals, a variable voltage source supplied by the exchange power supply and whose output forms the voltage drive for the line, a high-impedance monitor circuit which is also connected across the line so as to monitor the voltage between the two wires thereof, and a control circuit to which the output of said monitor is connected and which generates a reference condition which is applied to the voltage source so as to control the output voltage thereof, so that variations in line conditions cause compensatory variations in the line voltage supply.

Embodiments of the invention will now be described with reference to the drawings, in which FIG. 1 shows in simplified form the principles of a first embodiment of the invention in which a so-called programmable voltage source in series with the telephone subscriber's line is used.

Figure 1:
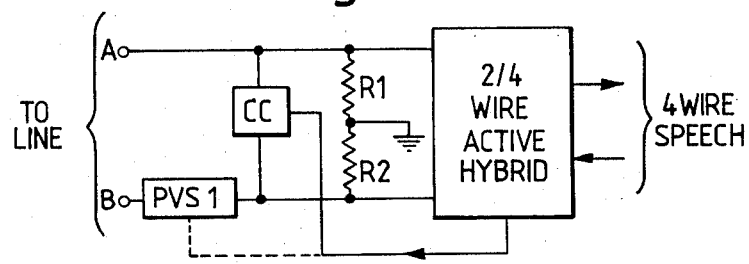

The arrangement of FIG. 1, which avoids the necessity for a line transformer, uses a matched pair of resistors R1, R2 to achieve line balance. These resistors perform the dual function of terminating the line and providing the necessary balance about earth. Thus the termination impedance of the line is equal to the value of these two resistors. The termination impedance can, if desired, be rendered complex by connecting other components across these resistors R1, R2.

The power feed to the subscriber's line is generated by a programmable voltage source PVS1 connected in one leg of the line. In the present context, the term "programmable" means that the voltage generated is adjustable in accordance with control conditions applied, including the actual line condition. This voltage source generates any required direct voltage needed to drive the line, and it has dynamic negative feedback with high gain so that its voltage output is maintained constant. Hence the voltage source has negligible impedance to alternating current, and hence to speech, provided there is sufficient gain in its feedback loop. The principle on which this source is based will be described below with reference to FIG. 8. The source PVS1 is so controlled that there is a potential of approximately 4 volts DC across the parallel combination of R1-R2 and a constant current circuit CC.

The circuit CC just mentioned directs the loop current so that it does not flow in the balance/terminating resistors R1-R2, thus avoiding excessive dissipation in those components. This programmable (i.e. adjustable) constant current source has inherently high impedance to speech, and the principles on which it is based will be described with reference to FIG. 7.

Since the source PVS1 is so controlled that only 4 volts is dropped across the constant current source CC and the resistors R1-R2, the absolute potential on the A wire with respect to earth is $-2$ volts. Similarly the absolute potential of the B wire to earth is $(-V_o+2)$ volts, where $V_o$ is the output voltage of the source PVS1. Since $V_o$ is always greater than 4 volts, both the A and the B wires are always at a negative potential to earth. This eliminates problems due to galvanic corrosion in the subscriber line plant.

The outgoing speech signal from the 2 wire $-4$ wire connector circuit is driven to the line via the constant current circuit, by modulating the steady state line current with this signal. The principle on which this is based is described below with reference to FIG. 10, from which it will be seen that a single driving transistor achieves a balanced speech drive from a source impedance of $2R_t$ (where $R_t$ is the value of $R_1$ or $R_2$). In principle it would be possible for the speech signal to be driven to line via the source PVS1, effectively modulating the steady state output voltage thereof. However, this would make the speech drive to line unbalanced, which is inferior from the cross-talk aspect.

The 2 to 4 wire hybrid uses active components based on an operational amplifier. The incoming speech from the line is sensed by an input amplifier with a high input impedance connected across the terminating resistors R1-R2. Due to the circuit configuration used, the potentials at this point, which are within a few volts of earth, are compatible with low voltage electronic technology, regardless of the higher voltage (of to about 80 volts) generated by the source PVS1 to drive the line.

Figure 2:
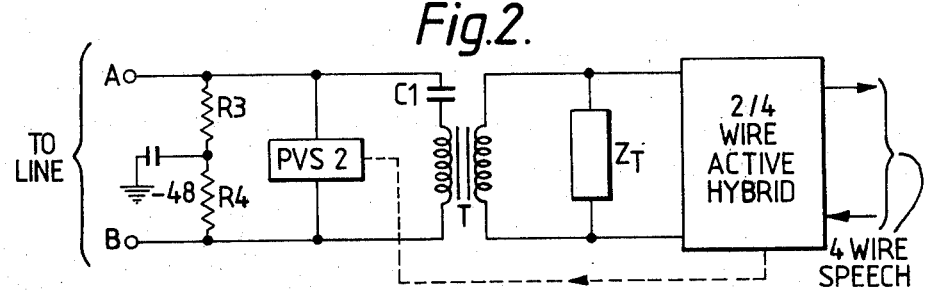
FIG. 2 is a schematic similar to FIG. 1, but in which the programmable voltage source is in parallel with the line.

In the arrangement shown in FIG. 2, line balance is achieved by matched resistors R3-R4 centre-tapped via battery to earth. The value of each of these resistors is in the region of 20 K ohms, the value being such as to ensure that there is no significant DC dissipation or AC speech loss in these resistors. The programmable source PVS2, which is connected across the line, has dynamic feedback so that it is effectively a constant current source and so has high impedance to speech. Its principles will be described later with reference to FIG. 9. As the centre-tap of R3-R4 is returned to the negative side of the exchange battery, the absolute potentials to earth of the line wires are:

A wire: $-48$ volts $+V_{out}$
B wire: $-48$ volts $-V_{out}$ so the potentials on these wires are always negative, provided $V_{out}$ (the voltage across PVS2) is less than 96 volts. This gives enough range to drive very long lines, and there is no problem due to galvanic corrosion of line plant.

Due to the isolating capacitor C1, the transformer T carries no direct current, and hence can be small. Thus complete electrical isolation is provided, so there is no restriction on the realization of the line terminating impedance $Z_T$, connected across the secondary of the transformer T. The 2 to 4 wire converter can be an active hybrid using operational amplifiers.

As in the case of the arrangement of FIG. 1 the outgoing speech signal may be driven via the programmable voltage source PVS2 if it is considered desirable. This gives a balanced speech drive as PVS2 is effectively in parallel with the line terminating impedance.

Figure 3:
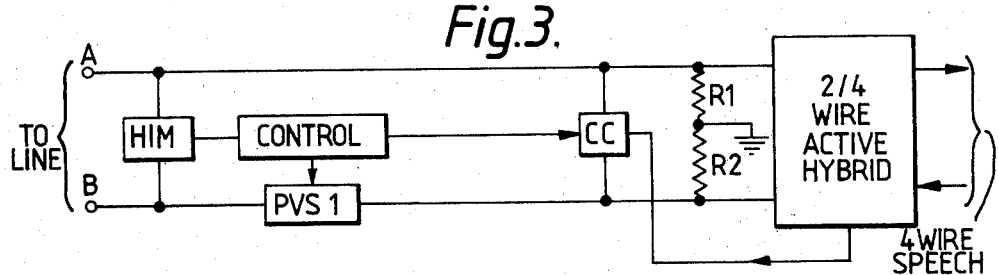
FIG. 3 shows an arrangement embodying the principles of FIG. 1 but in more detail.
Figure 4:
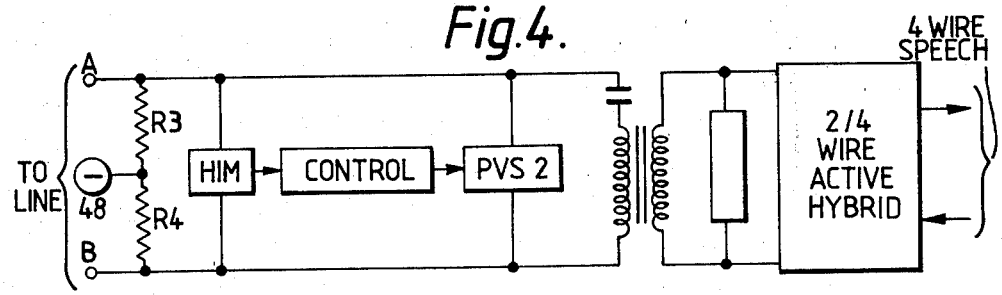
FIG. 4 shows an arrangement embodying the principles of FIG. 2 but in more detail.

FIGS. 3 and 4 show the additions needed to FIG. 1 and 2 respectively to realise any desired line feed characteristic. In each case a high-impedance monitor HIM is connected across the line wires, and this responds to line conditions to control the voltage source PVS1 or PVS2 via an intermediate control circuit. In the case of FIG. 3, the constant current source CC is also controlled in this manner. This is similar in some respects to the arrangements described in U.S. Patent Application Ser. No. 208,559 filed Nov. 20, 1980. Thus both circuits can provide either a constant voltage or a constant current type of line feed characteristic, in which in the idle (on-hook) condition the line voltage is in the region of 15–20 volts. This gives significantly lower line leakage than would be expected with a fixed 48 volt battery. As a subscriber's instrument is on-hook for the majority of the time, and in an exchange there are more lines on-hook than off-hook this provides a useful reduction in power consumption.

In both FIGS. 3 and 4, the monitor HIM monitors line voltage and/or current, and the control circuitry has a time constant such that its output is unresponsive to the speech signals on the line so that it only controls direct current and voltage line levels. See also the arrangements described in U.S. Patent Application Ser. No. 212,347 filed Dec. 8, 1980.

Figure 5:
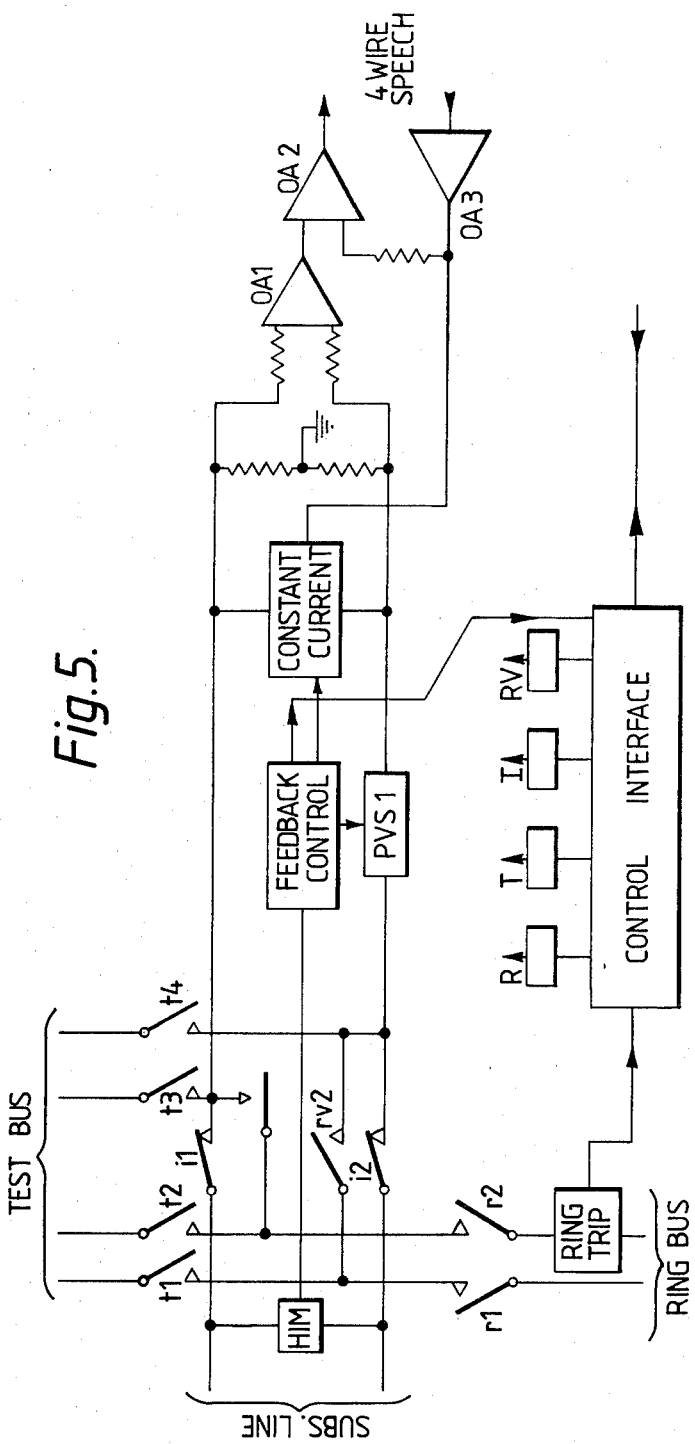
FIGS. 5 and 6 are further embodiments of the invention which follow the principles of FIGS. 1 or 2.
Figure 6:
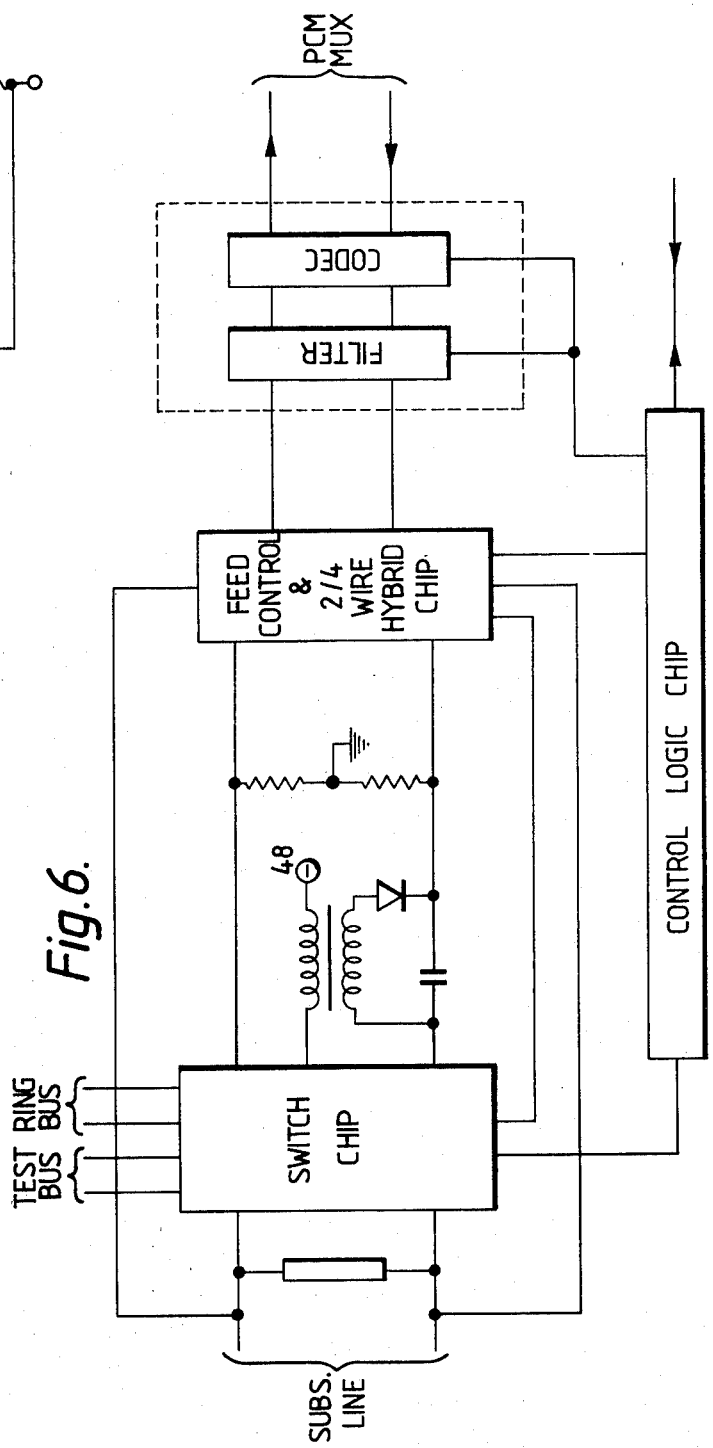

We now turn to FIGS. 5 and 6, which show how an arrangement embodying the principles of FIGS. 1 and 3 can be embodied into a complete line circuit.

In FIG. 5 a relay contact network is used to switch ringing current to line and to connect the line to the test bus. These relays are controlled from a Control Interface, which is itself controlled over the connections shown from the remainder of the exchange. The hybrid is shown as consisting in fairly conventional manner of three operational amplifiers OA1, OA2 and OA3. The operations of the relays R, T, I, V and RV under control of the Control Interface are not described as it is felt that they are clear from the drawing.

The high-impedance monitor HIM controls the constant current generator and the voltage source PVS1 via a feedback control circuit: this performs the functions of the CONTROL block of FIG. 3 and also exerts an influence on the Control Interface, so that the latter is influenced by line conditions.

In FIG. 6, the relay contact network of FIG. 5 is replaced by a switch chip including an array of high voltage DMOS switches controlled from a control logic chip, which also acts as a control interface with the rest of the exchange. The feed control (which in FIG. 5 included the monitor HIM, Feedback Control, Constant Current Source and voltage source PVS1) and the 2 to 4 wire hybrid are realized on another chip which interworks with the Switch Chip. Thus the transistor which drives the voltage source PVS1 is one of a group of high voltage transistors on DMOS chip.

Similar circuits to FIGS. 5 and 6 but derived from FIG. 2 and FIG. 4 can also be envisaged, but are not shown to avoid unnecessarily complicating the drawings.

Figure 7:
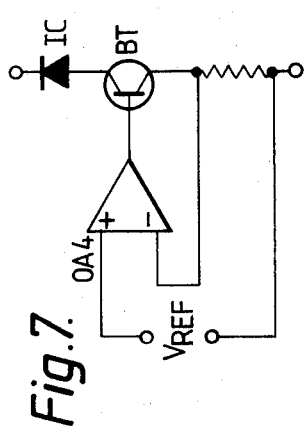
FIGS. 7, 8, 9 and 10 are circuit details of the various embodiments of the invention described herein.

FIG. 7 shows a simple way to realise a constant current circuit using an operational amplifier OA4 and a bipolar transistor BT. The actual value of the output current $I_c$ is controlled by a reference voltage $V_{Ref}$, which is itself controlled by the control block (FIG. 3).

Figure 8:
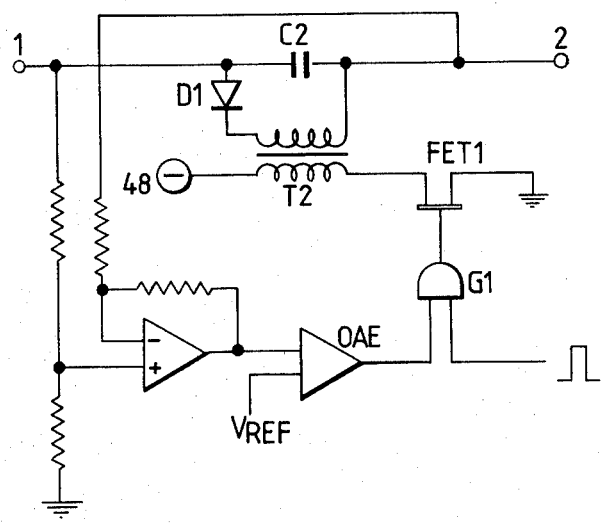

FIG. 8 is a realisation of the voltage source PVS1, showing a dynamic feedback loop in which the output voltage between terminals 1 and 2, based on an "energy pumping" circuit including a capacitor C2, diode D1, transformer T2 and field effect transistor FET1 is compared with the reference voltage $V_{Ref}$. The output of the comparator OAE is used to control the pulsed energy delivered into the pumping circuit such that the output voltage is controlled by $V_{Ref}$. The amount of energy delivered into the pumping circuit is controlled by various means, e.g. by changing the frequency or the width of the pulses applied to the gate G1.

Figure 9:
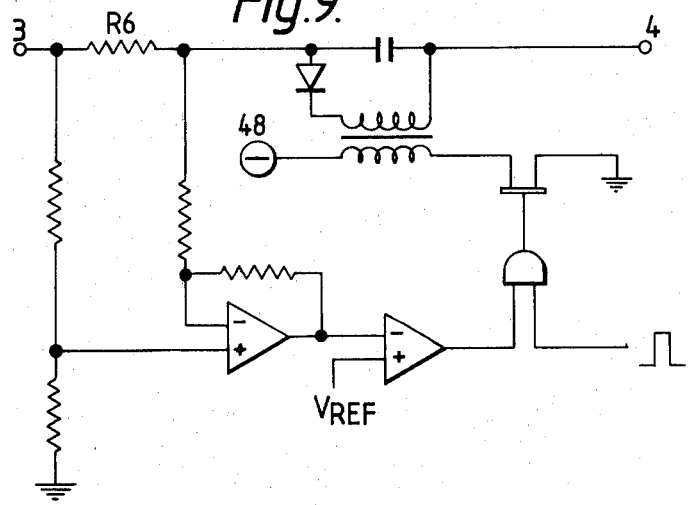

FIG. 9 shows the principle of the circuit of FIG. 8 used for PVS2, the voltage output appearing between the terminals 3 and 4. Here the sample voltage is that across R6, which is proportional to the output current from the pumping circuit. Hence, as in FIG. 8, the control circuitry controls the output voltage by controlling the value of $V_{Ref}$.

Figure 10:
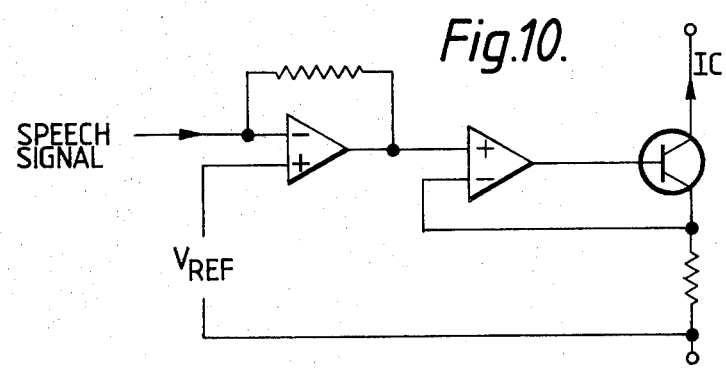

FIG. 10 shows how the constant current circuit of FIG. 7 may be modified so that the speech signal can modulate the output current $I_c$ delivered to the line loop. In all cases, the circuits described enable line voltage to be kept relatively low and to be adjusted to take account of line conditions, including line length.

We claim:

1. An arrangement as claimed in claim 1, a line feeding arrangement for a two-wire telephone subscriber's line, including a high valued balancing impedance connected between the two wires of the line, said impedance having a center-tap which is grounded for speech signals, a variable voltage source supplied by the exchange power supply and whose output forms the voltage drive for the line, a high-impedance monitor circuit connected across the line so as to monitor the voltage between the two wires thereof, and a control circuit to which the output of said monitor is connected and which generates a reference voltage condition which is applied to the voltage source so as to control the output voltage thereof, whereby variations in line conditions cause compensatory variations in the line voltage supply, in which the voltage source is connected in series in one of the wires of the line, a constant current circuit connected between the wires of the line in parallel with said balancing impedance, and in which the conditions of the constant current circuit are controlled in accordance with line conditions by said control circuit.

2. An arrangement as claimed in claim 1, and in which there are means for applying outgoing speech signals to the constant current circuit so as to modulate the current in the line in a balanced manner.

3. An arrangement as claimed in claim 1, a line feeding arrangement for a two-wire telephone subscriber's line, including a high valued balancing impedance connected between the two wires of the line, said impedance having a center tap which is grounded for speech signals, a variable voltage source supplied by the exchange power supply and whose output forms the voltage drive for the line, a high-impedance monitor circuit connected across the line so as to monitor the voltage between the two wires thereof, and a control circuit to which the output of said monitor is connected and which generates a reference voltage condition which is supplied to the voltage source so as to control the output voltage thereof, whereby variations in line conditions cause compensatory variations in the line voltage supply, and in which the variable voltage source is connected between the line wires in parallel with the balancing impedance and also functions as a constant current circuit.

4. An arrangement as claimed in claim 3, and in which speech signals outgoing to the line are applied to the variable voltage source so as to modulate the current in the line in a balanced manner.

5. An arrangement as claimed in claim 1 or 3, and in which the variable voltage source includes a capacitor the voltage across which is varied so as to vary the source's output voltage.

6. An arrangement as claimed in claim 5, and in which the variable voltage source includes a comparator which compares the line voltage with said reference voltage so as to vary the frequency or width of pulses applied to said capacitor.

7. An arrangement as claimed in claim 5, in which the line circuit includes an active hybrid which couples the two-wire line to a four wire path within the exchange.

8. An arrangement as claimed in claim 7, and in which the active hybrid includes a first operational amplifier to the inputs of which the two wires of the line are coupled via resistors to give the amplifier a high input impedance, a second operational amplifier to one input connection of which the output of the first operational amplifier is connected and whose output forms the incoming speech path of the four-wire path, a third operational amplifier which couples the outgoing speech path of the four-wire path to the outgoing line, and a balancing resistor connected between the output of the third operational amplifier and the other input of the second operational amplifier.

* * * * *